April 14, 1936.  A. M. KREMENTZ  2,037,581
OPHTHALMIC DEVICE
Filed Aug. 16, 1933
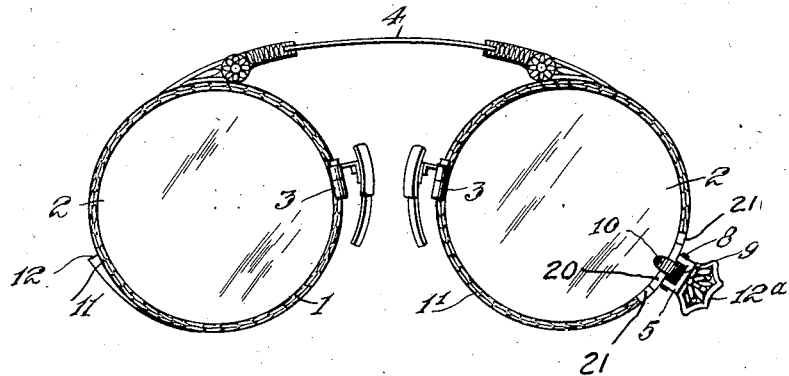
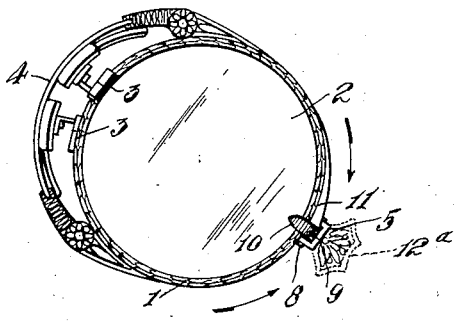
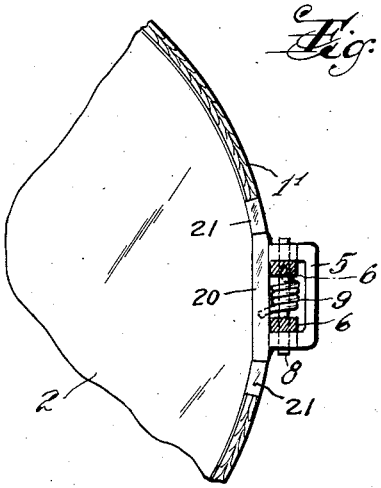
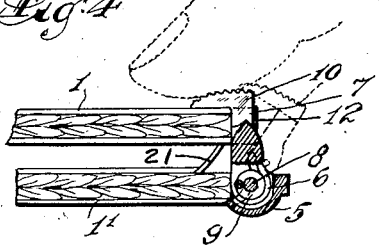
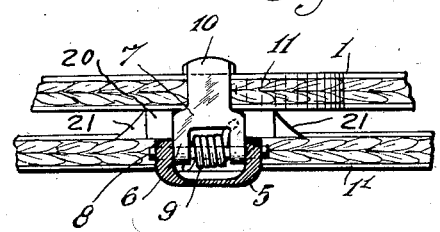
INVENTOR
Albert M. Krementz,
BY
Frank O. Fischer
ATTORNEY Patented Apr. 14, 1936

2,037,581

UNITED STATES PATENT OFFICE 2,037,581

OPHTHALMIC DEVICE

Albert M. Krementz, Maplewood Township, Essex County, N. J., assignor to Frank Krementz Company, Newark, N. J., a corporation of New Jersey Application August 16, 1933, Serial No. 685,309

2 Claims. (Cl. 88—44)

This invention relates to ophthalmic devices, and more particularly to eyeglasses of the "Oxford" or "folding" type which comprise a pair of eyeglass frames adapted to be folded into a compact position and having means to removably secure them in that position.

It has been common heretofore to provide one of the eyeglass frames with a protuberance designed to be received within a spring latch on the other frame. It has also been common to provide a handle for the glasses integral with the spring latch and tiltable therewith.

An object of my invention is to provide a novel construction of the latch member whereby the eyeglass handle will be independent of the latch and not movable therewith, in order that any form of handle may be used in connection with a standard type of latch.

A further object of my invention is to provide a latch of novel form, which together with the handle, is of such simple, neat and compact structure, that the eyeglass frames will not be unbalanced when positioned on the nose of the wearer, as is the case when bulky forms of latch and handle members are employed.

These and other advantageous objects which will later appear, are accomplished by the simple and practical construction and arrangement of parts hereinafter described and exhibited in the accompanying drawing, forming part hereof, and in which:

Fig. 1 is an elevational view of a pair of eyeglasses embodying my invention, the eyeglasses being shown in their open or extended position, Fig. 2 represents an elevational view of the eyeglasses in their closed position, Fig. 3 represents an enlarged fragmentary elevational view of the eyeglass frame to which the latch embodying my invention is secured, the latch being shown partially in cross section to illustrate the manner in which it is normally urged downwardly by the spring, Fig. 4 represents an enlarged fragmentary end elevational view of the eyeglasses in their closed position, showing the manner in which my improved latch secures the frames together, the latch being shown partially in cross section to reveal structural features thereof, and Fig. 5 represents an enlarged end elevational view of the eyeglasses in their closed position, the latch casing being shown cross sectionally to reveal structural features thereof.

It will be understood that my invention may be applied to any form of optical device, and to any form of eyeglasses, but, for the purpose of illustration, I have shown the same as used in connection with an "Oxford" or "folding" type of eyeglasses.

The ophthalmic device shown in the drawing, comprises a pair of lens frames 1, 1', in which a pair of lenses 2 are secured in any desired or convenient manner, such as by constructing the frames 1, 1' in the form of split rings held together by rivet members 3 or the like, the frames 1, 1' being connected by any convenient means such as by a bridge spring 4 or the like.

A casing 5 is secured to the frame 1' in any desired or convenient manner such as by soldering the same thereto, and the forked end 6 of a latch 7 is pivotally secured in said casing by means of a pivot pin 8 or the like, the latch being normally urged downwardly by a spring 9 coiled around the pivot pin 8 within the forked end 6 of the latch, and having its opposite ends secured to the frame and the latch.

When it is desired to close the eyeglass frames from their open position shown in Fig. 1, the frames are brought together as indicated by the arrows in Fig. 2. The protuberance 11, which is secured to the peripheral edge of the frame 1 will provide an eccentric surface which will force the latch 7 upwardly until the frames are exactly in registry, the protuberance being so designed that the defined sharp end 12 thereof will at that time be past the latch nosing 10 so that the nosing will snap down in front of the protuberance 11, as shown in Fig. 5, latching the frames together.

The frames may be opened only by manually tilting the latch 7 backward as shown in dotted lines in Fig. 4, until the nosing 10 clears the protuberance 11, at which time the frames 1, 1' which are normally urged apart by the hinge spring 4, will automatically snap into their open position as shown in Fig. 1.

The nosing 10 is preferably provided with serrations 10' to facilitate manipulation thereof. The casing 5 and the latch mechanism carried thereby comprise a complete unit, as shown in Figs. 3, 4 and 5. Therefore, any form or type of handle 12a may be used in connection therewith, and the latch mechanism which, as stated before, is complete in itself, is in no way affected by the particular type of handle used. For the purpose of illustration, I have shown in Figs. 1 and 2, a handle 12a which is secured to the casing 5 in any desired or convenient manner, as by soldering or the like, although any other desired or convenient form of handle may be secured either to the casing, or to the frame 1' as desired.

It will be further apparent that the latch disclosed herein is of extremely simple construction and light, and will not unbalance the eyeglass frame which is provided therewith, and that the structure disclosed prevents accidental opening of the frames when they are in their closed position. Adjacent the latch nosing 10, an arcuate ledge 20 projects upwardly from the frame 1', as shown in Figs. 1, 3, 4 and 5. The ledge 20 has inclined side portions 21 over which the frame 1 rides as it is moved into position to cause the latch nosing 10 to snap down in front of the protuberance 11. By means of the ledge 20, the frame member 1 and the lens carried thereby is automatically prevented from engaging frame member 1', and the lens carried thereby, as the frames are moved to the position shown in Fig. 2.

This feature is of considerable importance, especially when the frames carry toric lenses, which scratch against each other unless properly spaced.

The foregoing disclosure is to be regarded as descriptive and illustrative only, and not as restrictive or limitative of the invention, of which obviously an embodiment may be constructed including many modifications, without departing from the general scope herein indicated and denoted in the appended claims.

Having thus described my invention, what I claim as new and desire to secure by Letters Patent, is:

1. An optical device, comprising a pair of eyeglass frames connected together and normally urged apart by a spring bridge, a tapering protuberance on the peripheral edge of one of said frames, said protuberance being provided with a well-defined sharp edge, a casing secured to the peripheral edge of the other frame, a latch pivotally mounted in the casing and projecting above the frame to which the casing is secured, spring means normally urging said latch toward the frame to which the casing is secured and into a position to engage the protuberance to hold the two frames together, a ledge adjacent said latch projecting at right angles from the frame to which the casing is secured, said ledge having an inclined side, said frame carrying the protuberance riding over the inclined side onto the ledge as the two frames are brought into registry, the ledge spacing said frames apart and preventing contact between the lenses carried by said frames.

2. In an optical device, a pair of frames connected together and normally urged apart by spring means, eyeglass lenses carried by said frames, a tapering protuberance on the peripheral edge of one of said frames, a latch pivotally mounted on the peripheral edge of the other frame, and a ledge having an inclined side adjacent said latch projecting at right angles from the frame carrying the latch, said ledge being adapted to engage the frame carrying the protuberance as said last mentioned frame is moved into registry with the other frame, to cause the latch to engage the protuberance, said ledge spacing said frames apart and preventing contact between the lenses carried by said frames.

ALBERT M. KREMENTZ.